(12) United States Patent
Hamilton, Sr.

(10) Patent No.: US 9,571,803 B2
(45) Date of Patent: Feb. 14, 2017

(54) CELL PHONE VIDEO SAFETY MONITOR WITH ADJUSTABLE SUPPORT ARMS THAT ATTACHES EXTERNALLY TO THE BODY OF A CELL PHONE

(71) Applicant: Ricky Hamilton, Sr., Lewisville, TX (US)

(72) Inventor: Ricky Hamilton, Sr., Lewisville, TX (US)

(73) Assignee: Ricky Hamilton, Sr., Lewisville, TX (US)

( * ) Notice: Subject to any disclaimer, the term of this patent is extended or adjusted under 35 U.S.C. 154(b) by 289 days.

(21) Appl. No.: 14/053,851

(22) Filed: Oct. 15, 2013

(65) Prior Publication Data
US 2014/0111646 A1    Apr. 24, 2014

Related U.S. Application Data

(60) Provisional application No. 61/716,886, filed on Oct. 22, 2012.

(51) Int. Cl.
*H04N 7/18* (2006.01)
*B60R 1/00* (2006.01)
(Continued)

(52) U.S. Cl.
CPC .......... *H04N 7/183* (2013.01); *B60R 1/00* (2013.01); *B60R 11/04* (2013.01); *B60R 2011/0033* (2013.01)

(58) Field of Classification Search
None
See application file for complete search history.

(56) References Cited

U.S. PATENT DOCUMENTS

| 6,889,064 B2 * | 5/2005 | Baratono | B60R 1/12 340/815.4 |
| 8,240,628 B2 * | 8/2012 | Huang | F16M 11/04 248/122.1 |

(Continued)

FOREIGN PATENT DOCUMENTS

GB          2390259       * 12/2003

*Primary Examiner* — William C Vaughn, Jr.
*Assistant Examiner* — Lindsay Uhl

(57) ABSTRACT

Some embodiments of the invention include a novel cell phone safety monitoring system that assists a cell phone user to remain aware of areas of concern while the person is dialing, texting, or viewing text messages on the cell phone. The cell phone safety monitoring system works independently of the dialing and texting features of the cell phone and comprises an interactive camera to capture images of the areas of concern and a video safety monitor with adjustable support arms to display the captured images. In some embodiments, the interactive camera is physically separate from the cell phone and the video safety monitor with adjustable support arms. The camera can be placed anywhere suitable to capture video of areas of concern to send to the video safety monitor with adjustable support arms. In some embodiments, the video safety monitor with adjustable support arms and the cell phone are separate devices and are externally connected together by a retractable pedestal the adjustable support arms. In some other embodiments, the safety monitor is integrated into the texting display screen of the cell phone.

6 Claims, 2 Drawing Sheets

(51) Int. Cl.
B60R 11/04     (2006.01)
B60R 11/00     (2006.01)

(56) References Cited

U.S. PATENT DOCUMENTS

| | | | | |
|---|---|---|---|---|
| 2002/0158812 | A1* | 10/2002 | Pallakoff | H04M 1/0214 345/5 |
| 2003/0153363 | A1* | 8/2003 | Kuwazoe | H04M 1/72527 455/566 |
| 2005/0146600 | A1* | 7/2005 | Chipchase | H04M 1/72522 348/14.02 |
| 2006/0287821 | A1* | 12/2006 | Lin | B60R 1/12 701/469 |
| 2007/0084978 | A1* | 4/2007 | Martin | F16M 11/105 248/176.1 |
| 2007/0153456 | A1* | 7/2007 | Lin | G06F 1/1616 361/679.04 |
| 2011/0210922 | A1* | 9/2011 | Griffin | G06F 1/1624 345/173 |
| 2012/0274808 | A1* | 11/2012 | Chong | H04N 5/2258 348/234 |
| 2013/0231157 | A1* | 9/2013 | Chung | H04M 1/0264 455/556.1 |
| 2014/0080540 | A1* | 3/2014 | Hsiao | H04M 1/0264 455/556.1 |

* cited by examiner

CELL PHONE VIDEO SAFETY MONITOR WITH ADJUSTABLE SUPPORT ARMS THAT ATTACHES EXTERNALLY TO THE BODY OF A CELL PHONE

CLAIM OF BENEFIT TO PRIOR APPLICATION

This application claims benefit to U.S. Provisional Patent Application 61/716,886, entitled "A New and Improved Cell Phone video safety Monitor with adjustable support arms," filed Oct. 22, 2012. The U.S. Provisional Patent Application 61/716,886 is incorporated herein by reference.

BACKGROUND

Embodiments of the invention described in this specification relate generally to safety devices, and more particularly, to camera and monitor safety devices including a video safety monitor with adjustable support that externally attaches to the body of a cell phone with support arms and interlocking ridges. This video safety monitor with adjustable support arms works in concert with an interactive camera. The interactive camera is focused on an area of concern in which the captured image is transmitted back to the video safety monitor with adjustable support arms. For the purpose of clarity. "Area of Concern" is defined as the area the user focuses the interactive camera, e.g., front windshield, backseat, etc.

Dialing and texting on a cell phone while driving or walking can be dangerous to the cell phone user and others nearby the cell phone user. For instance, property damage and human injuries, hospitalizations, and deaths have resulted from people dialing, texting, or reading text messages on cell phones. This is a problem for drivers of automobiles who use a mobile communication device while driving a vehicle. This is also a problem for pedestrians and drivers of other automobiles who are exposed to driver using a cell phone.

Various cameras and monitors exist to assist drivers in a number of capacities (i.e., a backup safety camera to view objects that may be present behind a car, a bumper camera to assist drivers in parallel parking, etc.). However, none of the existing cameras or monitors allow cell phone users any measure of safety while dialing, texting, and reading text when engaged in a road-related activity, such as walking, driving, or even idling at a traffic light. This safety video monitor with adjustable support arms being attached externally to the body of a cell phone will allow a measure of safety. This is made possible by the adjustable support arms that lock the video externally to the body of the cell phone. This video monitor will work in concert with an existing camera focused on an area by the user (an area of concern).

Other currently existing safety mechanisms work in concert with the cell phone to prevent dialing, viewing, or texting. This is a problem for cell phone users who expect to have the ability to use their cell phone for any necessary moment, including times when a user is engaged in such a road-related activity. For example, a person who is driving an automobile in an emergency situation may need to call the police, the fire department, a doctor or hospital, a family member, a friend, or any of several other parties who need to be informed of the emergency.

Therefore, what is needed is a safety mechanism that works independently of dialing, viewing, and texting features of a cell phone to assist a person in remaining attentive to areas of concern while the person is using the cell phone to dial, view, or text.

BRIEF DESCRIPTION

Some embodiments of the invention include a novel cell phone safety monitoring system that assists a cell phone user to remain aware of areas of concern while the person is dialing, texting, or viewing text messages on the cell phone. The cell video phone safety monitoring system works independently of the dialing and texting features of the cell phone and comprises an externally attached video safety monitor with support arms to capture images of the areas of concern when they are transmitted from the interactive camera, and a safety monitor to display the captured images. In some embodiments, the camera can be placed anywhere suitable to capture video of areas of concern to send to the externally attached video safety monitor with adjustable support arms. In some embodiments, the video safety monitor with adjustable support arms and the cell phone are separate devices and are connected together by a retractable pedestal. In some other embodiments, the safety monitor is integrated into a display texting screen of the cell phone.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel cell phone safety monitoring system that assists a cell phone user to remain aware of areas of concern while the person is using a feature of the cell phone. The feature being used in some embodiments is one of dialing, texting, and viewing. The cell phone safety monitoring system comprises of an externally attached safety video monitor with adjustable support arms that is attached to the body of the cell phone by the video safety monitor adjustable support arms. The interactive camera of some embodiments captures a video sequence of images of the areas of concern and transmits the video to the video safety monitor with adjustable support arms. In some embodiments, the video safety monitor with adjustable support arms receives the video from the interactive camera and displays the video for the cell phone user to see.

In some embodiments, the interactive camera is physically separate from the cell phone and the video safety monitor. The interactive camera of some embodiments comprises an image capturing device for receiving light through a lens, a power source, and a wireless transceiver for transmitting captured video. In some embodiments, the power source is one of a 9 volt battery and a 12 volt DC connected to a charge port with USB cable (i.e., USB to vehicle cigarette lighter). The camera can be placed anywhere suitable for the lens to view a scene and for the wireless transceiver to send video data to the monitor.

Figure 1:
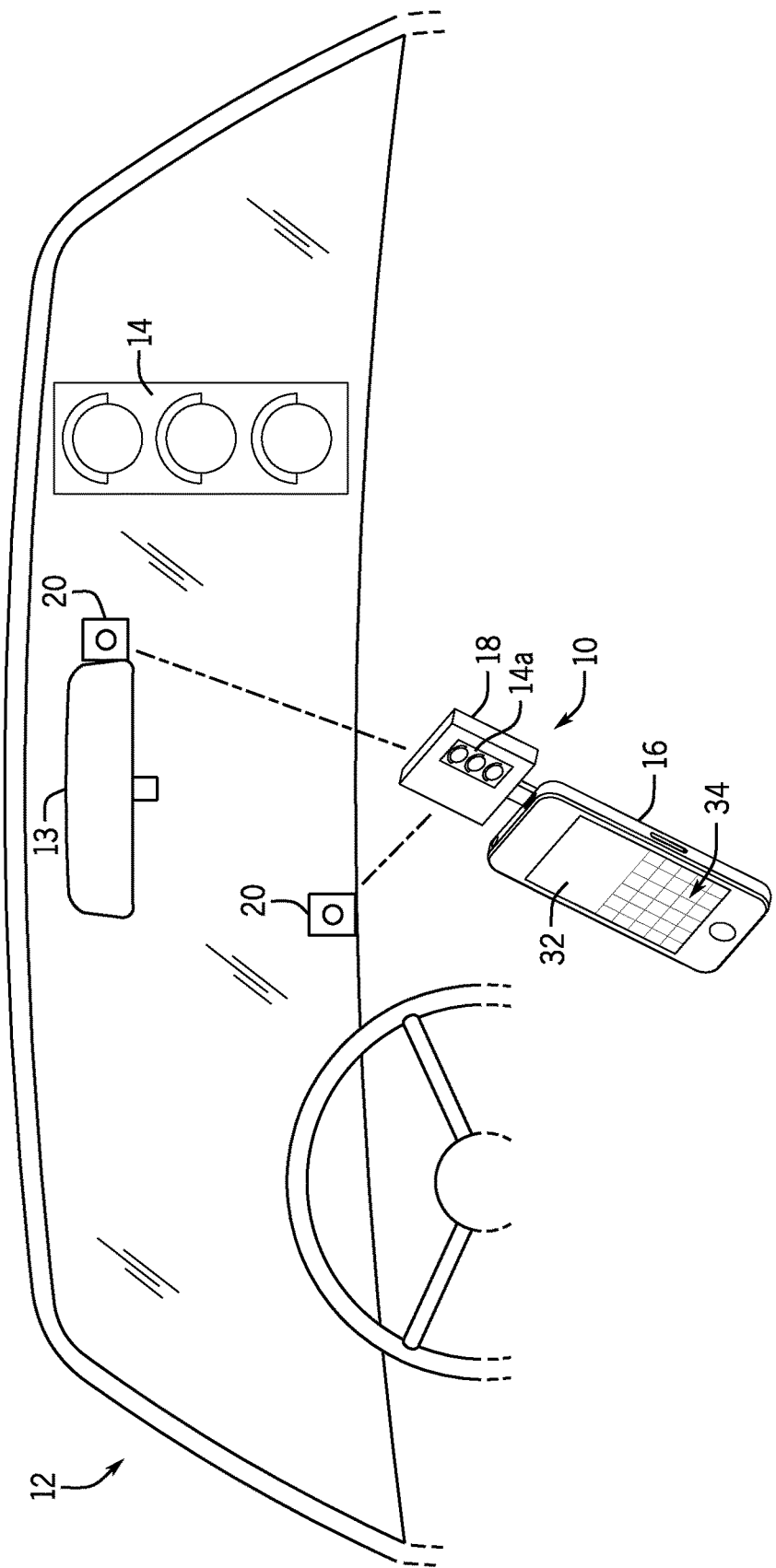
FIG. 1 conceptually illustrates a perspective view of a cell phone video safety monitor with adjustable support arms that attaches externally to the body of a cell phone by the support arms and images being sent to the video safety monitor with support arms from the interactive camera in use in some embodiments.

By way of example, FIG. 1 conceptually illustrates a perspective view of an example cell phone safety monitor and interactive camera in use in some embodiments. As shown in this figure, a cell phone safety monitoring system 10 is being used in an automobile 12. The cell phone safety monitoring system 10 in this example includes a cell phone video safety monitor with adjustable support arms 18 that is connected to a cell phone 16. An interactive camera 20 is shown attached to a rear view mirror 13 of the automobile 12. In this example, another interactive camera 20 is shown attached to the dash board of the automobile so that the cell phone user may remain aware of areas of concern while the person is dialing, texting, or viewing text messages on the cell phone. In this example, alternate positioning of the interactive camera 20 is illustrated. However, in some embodiments, multiple interactive cameras 20 can be deployed for use with a single video safety monitor with adjustable support arms 18 in a cell phone safety monitoring system 10.

The cell phone safety monitoring system 10 is able to capture one or more images of the surrounding scene outside of the automobile 12. Specifically, in this example, the interactive camera 20 captures an image of a traffic light 14 and transmits the image data (shown by dashed lines) to the video safety monitor with adjustable support arms 18. Once received, the video safety monitor with adjustable support arms 18 displays the traffic light image 14a. Although this example illustrates the cell phone safety monitoring system 10 in use by way of a single image 14a, the interactive camera 20 captures a video sequence of images and transmits the video to the video safety monitor with adjustable support arms for real-time playback once received.

As stated above, dialing, texting, and reading text on a cell phone while driving or walking can be dangerous to the user. Many people have been injured, hospitalized, or killed, and property has been damaged while dialing, texting, and reading text on a cell phone. However, when a user of the cell phone 16 is viewing something on the display screen 32 of the cell phone 16, or when the user is dialing a number or typing a text message using the keypad 34 of the cell phone 16, the user's attention to the area surrounding the automobile 12 will not be lost. Thus, as the example in FIG. 1 illustrates, the cell phone safety monitoring system 10 allows the user to dial, text, and read text while mitigating the chances of causing an injury or damaging property.

In some embodiments, the cell phone video safety monitor with adjustable support arms and the cell phone are separate devices. In some of these embodiments, the cell phone safety monitor comprises a receiver for receiving video from the interactive camera, the video safety monitor with adjustable support arms externally attached to the body of the cell phone. In some embodiments, the video safety monitor with adjustable support arms can be placed in a position behind the cell phone when not in use.

Figures 2, 3:
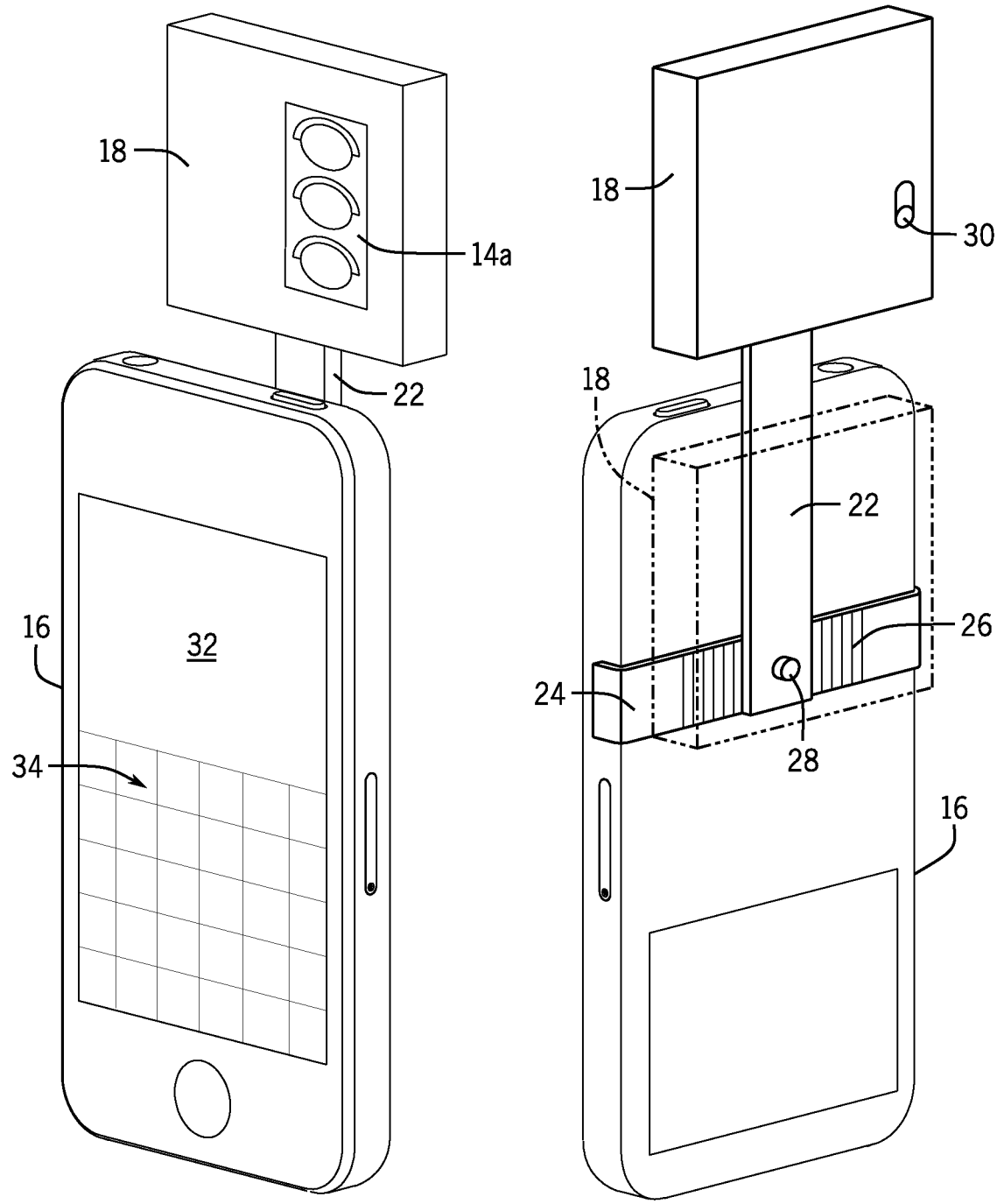
FIG. 2 conceptually illustrates a front perspective view of a cell phone video safety monitor with adjustable support arms that is a separate device from but connects to a cell phone in some embodiments.
FIG. 3 conceptually illustrates a rear perspective view of a cell phone video safety monitor with adjustable support arms that is a separate device from but connects to a cell phone some embodiments.

FIG. 2 conceptually illustrates a front perspective view of a cell phone video safety monitor with adjustable support arms that is a separate device from but connects to a cell phone in some embodiments. As shown in this figure, the monitor 18 displays an image 14a of the traffic light. In this example, the cell phone 16 has an integrated keypad 34 and display screen 32. However, the video safety monitor with adjustable support arms 18 is separate from the cell phone, connecting by way of the adjustable support arms with interlocking ridges.

FIG. 3 conceptually illustrates a rear perspective view of a video cell phone safety monitor with adjustable support arms that is a separate device from but connects externally to the body of a cell phone in some embodiments. As shown in this figure, the monitor 18 includes a switch 30 to turn the video safety monitor with adjustable support arms 18 off and on. When the pedestal 22 is retracted, the monitor 18 rests behind the cell phone (shown by dashed lines). In some embodiments, the video safety monitor with adjustable support arms 18 secures externally to the body of the cell phone 16 by an adjustable phone support 24. In some embodiments, the adjustable video safety monitor support arms comprise ridges 26 to support the connection. In some embodiments, a securing screw 28 is further included to secure the video safety monitor with adjustable support arms externally to the cell phone. While other cameras and monitors on cell phones are designed to allow the users to be actively engaged in taking a photo or video recording of a person, a place, or a thing, the cell phone safety monitoring system described in the examples above allows the cell phone user to view areas of concern while dialing a number, inputting a text message, or reading a text message on the cell phone.

In some embodiments, the video safety monitor with adjustable support arms can be physically detached from the cell phone and placed in a location that allows the cell phone user to observe areas of concern while using the cell phone. For example, the video safety monitor with adjustable support arms can be placed along the dash board where the radio controls are located. The interactive camera can also be used in alternative places in order to provide views of different areas of concern. For example, an interactive camera can be positioned to capture video of the backseat of an automobile where a baby or small child is seated in a safety seat.

Although the examples above pertain to a cell phone safety monitoring system 10 comprising a cell phone video safety monitor with adjustable support arms 18 that is physically separate from the cell phone 16, in some other embodiments, a cell phone safety monitor is integrated into the display texting screen of the cell phone. Like the video safety monitor with adjustable support arms 18 that connects externally to the body of the cell phone 16 in some of the embodiments described above, the integrated safety monitor works independently of the dialing and texting mechanisms of the cell phone. In some embodiments, the integrated safety monitor partitions the display screen of the cell phone in order to display the video. This allows the user to continue dialing, texting, and/or reading text messages in other partitioned display screen area.

The examples above focused on a cell phone safety monitoring system in which an interactive camera is mounted or placed in an automobile location with ample visibility to areas of concern outside of the automobile. Thus, any location near the front windshield (e.g., the dashboard, the rear view mirror, etc.) are suitable locations for placement of the interactive camera. However, in some embodiments, the interactive camera attaches to an apparel item that a cell phone user is wearing. Examples of apparel items to which the interactive camera can be attached include athletic wear, hats, headbands, belts, shoes, etc. The interactive camera operates in a similar manner as described above, capturing video sequences of images of a surrounding area and transmitting the captured video to a cell phone safety monitor or integrated cell phone display screen while the cell phone user is using the cell phone. In some cases, the cell phone user may be walking, sitting, or performing some other activity. By having the interactive camera mounted to an apparel item of the cell phone user in these situations, the cell phone user can stay aware of dangerous things in the surrounding area while dialing, texting, or reading a text message.

Thus, the safety monitor and separate interactive camera can be used as a safety feature when walking dialing, texting or reading text on a cell phone. The user can see the activities occurring behind the person texting, dialing or reading text on the cell phone. The user can see when a traffic light goes from red to green while typing or dialing, texting, or reading text on the cell phone and see if the car is veering from the drive lane or approaching a vehicle that is stopped in front of them, thereby limiting the chances of impeding traffic and possible road rage.

The safety monitor in some embodiments includes additional features to alert a cell phone user of possible dangerous situations. For example, the safety monitor can include a flashing device or an audible device to warn if your vehicle is within a certain distance of a structure while moving at least at a specified threshold speed determined to cause damage or injury or to warn if your vehicle is veering from its drive lane while moving. A warning signal to cause the cell phone to vibrate, for example, if the vehicle gets too close to a structure or too close to another vehicle that may cause a crash. This warning signal would be sent to the cell phone by a device (via infrared, etc.) from the interactive camera.

Additionally, the interactive camera can be used to send images of concerns to a tablet computing device. The safety monitor can be separate from the tablet or cell phone.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A cell phone safety monitoring system that works independently of dialing and texting features of a cell phone to provide views of an area surrounding a person who is using the cell phone to dial, text, or read a text message, the cell phone safety monitoring system comprising:
    an interactive camera that captures image of the area, said interactive camera placed at a position in view of the area;
    a video safety monitor, with adjustable support arms, that wirelessly receives and displays the captured image, said video safety monitor with adjustable support arms connected externally to the body of the cell phone that the person is using and placed in view of the person;
    wherein the safety monitor with adjustable support arms protracts behind the cell phone to place the safety monitor in a position adjacent to the cell phone display screen that is viewable to the cell phone user without obstructing the cell phone display screen; and
    wherein the safety monitor further comprises an adjustable phone support with ridges coupled to the support arms for securing the safety monitor to the back of the cell phone when the safety monitor is fully retracted.

2. The cell phone safety monitoring system of claim 1, wherein the interactive camera captures a plurality of images in a video sequence of the area and transmits the images back to the video safety monitor with adjustable support arms.

3. The cell phone safety monitoring system of claim 1, wherein said interactive camera is placed on a surface of a rear view mirror of an automobile in view of an area in front of the automobile and transmits the images back to the video safety monitor with adjustable support arms.

4. The cell phone safety monitoring system of claim 1, wherein the Interactive camera is a first interactive camera, said cell phone safety monitoring system further comprising a second interactive camera placed at a dashboard position in view of a backseat of an automobile.

5. The cell phone safety monitoring system of claim 1, wherein the interactive camera sends image data to a wireless receiver of the video safety monitor with adjustable support arms.

6. The cell phone safety monitoring system of claim 1, wherein the safety monitor with adjustable support arms comprises a set of adjustable support arms, that externally connects the video safety monitor to the body of the cell phone.

* * * * *